M. A. WIER.
SPEED INDICATOR.

No. 170,213. Patented Nov. 23, 1875.

Witnesses  
Inventor  
Marshall Arthur Wier

UNITED STATES PATENT OFFICE.

MARSHALL A. WIER, OF LONDON, ENGLAND.

IMPROVEMENT IN SPEED-INDICATORS.

Specification forming part of Letters Patent No. 170,213, dated November 23, 1875; application filed December 7, 1874.

*To all whom it may concern:*

Be it known that I, MARSHALL ARTHUR WIER, of No. 33 Abchurch Lane, in the city of London, in the county of Middlesex and Kingdom of Great Britain, have invented certain Improvements in Apparatus for Indicating and Registering the Speed of Revolving Machinery, and of certain other moving objects, of which the following is a specification:

The invention has for object the production of an apparatus which shall indicate, and if needful record, automatically the speed or number of revolutions in a given time of prime movers, machinery, and certain other moving objects, in such manner that the said speed or number of revolutions can be ascertained by simple inspection, and without counting or reference to a time-piece; and consists in applying to the object of which the speed of rotation is to be ascertained a fan or screw, preferably of a helical or spiral form, which is caused to revolve at a speed proportioned to and regulated by that of such rotating object. The blades of the fan or screw revolve in air or liquid, and, according to an arrangement of the apparatus, the fan or screw is free to slide to a certain extent along the axis on which it is placed. The oblique action of the said blades upon the air or liquid in which they revolve causes this sliding of the fan or screw to take place against the counter resistance of a spring or weight, to a greater or lesser extent, in proportion to the speed of its rotation. This sliding motion of the fan or screw is transmitted to a pointer, causing it to be deflected more or less, according to the speed of the revolving object. A graduated scale indicates the amount of the deflection, and, inferentially, the speed at which the object is revolving at the moment of the observation.

Figure 1:
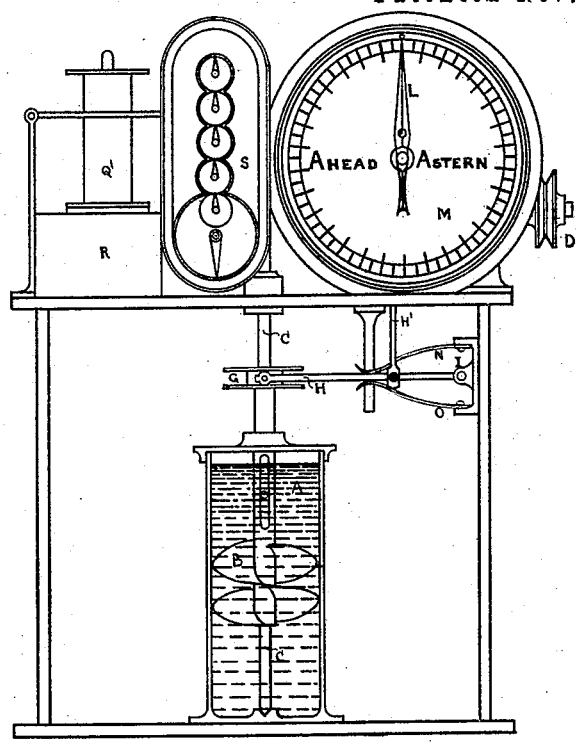
Figure 2:
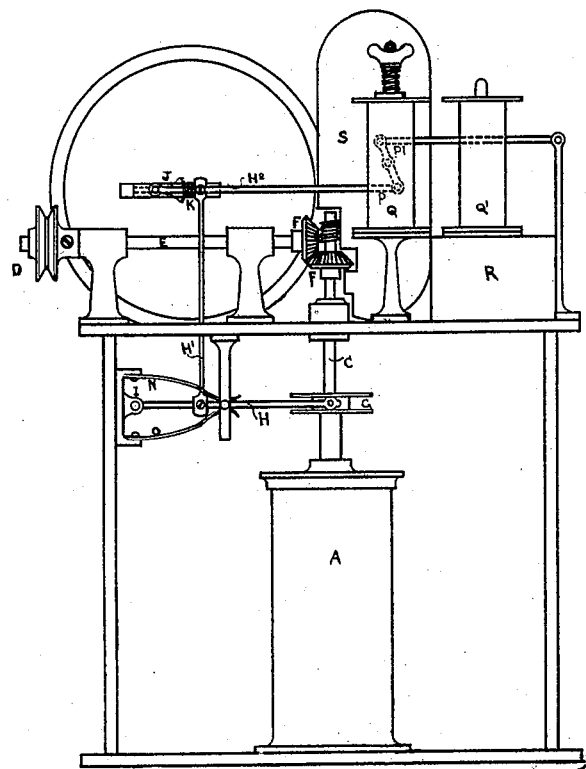

In the drawing, Figure 1 represents a front elevation, partly in section, of an apparatus constructed in accordance with this arrangement, in which the screw revolves in a liquid. Fig. 2 represents a back elevation of the same.

A is a cylindrical vessel, containing the liquid, which may be water, oil, or any other suitable fluid; but I prefer glycerine, or a mixture of glycerine and water, in the proportion of about three parts, by measure, of glycerine to one part, by measure, of water; B, the fan or screw, capable of sliding on the axis C, but constrained to turn therewith by means of a key or feather. Motion is imparted to the screw B from the revolving object the speed of which it is desired to ascertain by means of a band passing therefrom over the pulley D on the axis E, which drives the axis C through the miter-wheels F, or by any other convenient means. G is a double collar on the fan or screw; H, a lever, centered at I, and having a forked end, which takes between the flanges of the double collar G. A link, $H^1$, connects the lever H to a lever, $H^2$, which has fixed to it the sectoral toothed rack J, gearing with the pinion K on the axis of the pointer L, arranged to move over the graduated dial-face M. The levers H $H^2$ and fan or screw B are held, when the latter is at rest, in a normal position, by the springs N O, the pointer L then standing at zero on the scale of the dial-plate. It will now be understood that, rotary motion being imparted to the fan or screw B in one direction, the resistance of the liquid to the motion of the oblique blades thereof will cause it to rise in the vessel A, and, by the double collar G, to raise levers H $H^2$ and sectoral rack J, turning the pointer in one direction, and to an extent proportionate to the speed of rotation of the screw, and consequently of the object by which it is driven. If the driving object is made to revolve in the opposite direction, the screw and levers are depressed, and the pointer L also turned in the opposite direction, the scale on the dial being suitably graduated, and marked in both directions from the zero-point, the number of revolutions in a given time may be ascertained by simple inspection, as also the direction in which the object may be rotating. The springs N and O tend to return the screw toward its normal position, and consequently the pointer toward zero, whenever any diminution of the speed takes place. When it is desired to register graphically the times, speeds, and changes of direction of motion, the lever $H^2$ is extended, as at P, and made to carry a pencil at its end, or, preferably, in the link of a parallel motion, as shown at $P'$. The pencil traces a line on a sheet of suitably-ruled paper wound on the bobbins Q $Q'$, a uniform motion being imparted to the paper by clock-work contained in the case R, in the well-known manner. When the screw is stationary, the pencil traces a straight center line on the paper. When the screw is set in motion, the pencil traces a line more or less above or below the center line, according to the speed and direction of rotation, fluctuations of speed being shown by a zigzag line, the distances of which from the center line, being measured on a suitable scale, indicate the various speeds, while the distance along the center line indicates the time.

When the screw revolves in air instead of a liquid, a similar arrangement of apparatus may be employed; but the fan or screw then requires to be made larger, and to be driven at a higher speed.

In some cases an ordinary counting apparatus, S, may also be applied to the axis of the fan or screw to register the total number of revolutions made by it or by the revolving object.

I claim—

In an apparatus for indicating the speed of machinery, the combination of the cylinder A, fixed revolving shaft C, vertically-movable screw B, collar G, levers H H$^2$, connecting-rod H$^1$, springs N O, and an indicating or recording mechanism, substantially as herein described, for the purpose set forth.

MARSHALL A. WIER.

Witnesses:
W. H. BECK, 139 *Cannon St., London.*
S. E. GUNISON, 139 *Cannon St., London.*